United States Patent
Han et al.

(10) Patent No.: US 9,344,979 B2
(45) Date of Patent: May 17, 2016

(54) TIME SYNCHRONIZATION METHOD AND TIME SYNCHRONIZATION DEVICE FOR MOBILE COMMUNICATIONS SYSTEM

(75) Inventors: Liuyan Han, Beijing (CN); Han Li, Beijing (CN); Lei Wang, Beijing (CN)

(73) Assignee: CHINA MOBILE COMMUNICATIONS CORPORATION (CN)

( * ) Notice: Subject to any disclaimer, the term of this patent is extended or adjusted under 35 U.S.C. 154(b) by 156 days.

(21) Appl. No.: 13/884,022

(22) PCT Filed: Nov. 8, 2011

(86) PCT No.: PCT/CN2011/081924
§ 371 (c)(1),
(2), (4) Date: May 8, 2013

(87) PCT Pub. No.: WO2012/062198
PCT Pub. Date: May 18, 2012

(65) Prior Publication Data
US 2013/0230041 A1    Sep. 5, 2013

(30) Foreign Application Priority Data
Nov. 8, 2010   (CN) .......................... 2010 1 0538995

(51) Int. Cl.
*H04J 3/06*   (2006.01)
*H04W 56/00*   (2009.01)

(52) U.S. Cl.
CPC ........... *H04W 56/001* (2013.01); *H04J 3/0641* (2013.01)

(58) Field of Classification Search
USPC ................ 370/255, 350, 466, 328, 335, 342, 370/395.2; 709/224, 225
See application file for complete search history.

(56) References Cited

U.S. PATENT DOCUMENTS

| 6,711,411 | B1 | 3/2004 | Ruffini |
| 2004/0176958 | A1* | 9/2004 | Salmenkaita ..... H04M 1/72561 704/275 |

(Continued)

FOREIGN PATENT DOCUMENTS

| CN | 101465707 A | 6/2009 |
| CN | 101547083 A | 9/2009 |

(Continued)

OTHER PUBLICATIONS

International Search Report issued in PCT/CN2011/081924, dated Feb. 23, 2013, with English translation.

(Continued)

*Primary Examiner* — Phuongchau Ba Nguyen
(74) *Attorney, Agent, or Firm* — Hauptman Ham, LLP

(57) ABSTRACT

The present invention discloses a time synchronization method and a time synchronization device for a mobile communication system. When the time status of one type of time protocol is bad, a different type of time protocol having a better status can be automatically selected, thereby the system flexibility and the time information quality and reliability can be effectively enhanced. The time synchronization method for a mobile communication system may comprise: selecting respectively an optimal time source for each type of time protocol port of at least two types of time protocol ports; selecting a system optimal time source from optimal time sources for respective types of time protocol ports.

20 Claims, 4 Drawing Sheets

(56) References Cited

U.S. PATENT DOCUMENTS

| | | | |
|---|---|---|---|
| 2007/0064851 A1 | 3/2007 | Hall, II | |
| 2010/0254225 A1* | 10/2010 | Schweitzer, III | H02H 1/0069 368/47 |
| 2013/0039220 A1* | 2/2013 | Ruffini et al. | 370/255 |
| 2013/0230041 A1* | 9/2013 | Han et al. | 370/350 |

FOREIGN PATENT DOCUMENTS

| | | | |
|---|---|---|---|
| CN | 101790230 A | 7/2010 | |
| CN | 101848193 A | 9/2010 | |
| WO | WO 2011/072881 A1 * | 6/2011 | H04J 3/06 |

OTHER PUBLICATIONS

Russian Application No. 2013125700/07(037944), Office Action issued Aug. 6, 2014.

Russian Application No. 2013125700/07(037944), Office Action issued Jan. 28, 2015.

Written Opinion mailed Feb. 23, 2012 in International Application No. PCT/CN2011/081924, filed Nov. 8, 2011.

Chinese Office Action dated Jan. 6, 2014 in China Application No. 2010105389959.

* cited by examiner

US 9,344,979 B2

TIME SYNCHRONIZATION METHOD AND TIME SYNCHRONIZATION DEVICE FOR MOBILE COMMUNICATIONS SYSTEM

RELATED APPLICATIONS

The present application is a National Phase of PCT/CN2011/081924, filed Nov. 8, 2011, and is based on, and claims priority from, Chinese Patent Application Serial No. 201010538995.9, filed with the State Intellectual Property Office of P. R. China on Nov. 8, 2010 with a title of "TIME SYNCHRONIZATION METHOD AND TIME SYNCHRONIZATION DEVICE FOR MOBILE COMMUNICATIONS SYSTEM", the entire content of which is incorporated herein by reference.

BACKGROUND OF THE INVENTION

1. Field of the Invention

This invention relates to a transmission technical field, and more particularly to a time synchronization method and a time synchronization device for a mobile communication system.

2. Description of the Prior Art

With the development of mobile communication techniques, Code Division Multiple Access 2000 (CDMA2000), Wideband Code Division Multiple Access (WCDMA), and Time Division-Synchronous Code Division Multiple Access (TD-SCDMA) mobile communication systems require high precision time synchronization.

The problem of time synchronization in a base station can be solved by employing a Global Positioning System (GPS) module in each base station. However, in view of national security and low cost, there are some other ways to fulfill time synchronization. For example, satellite time sources are collected, information on satellite time is sent to respective base stations through a terrestrial transmission network, without employing a GPS module in each base station. Since it is not necessary to install a GPS module in a base station, cost can be reduced and national security can be guaranteed. When transmitting time information via a network, the time information is delivered among devices through respective time transmission protocols and time ports.

However, in a conventional time synchronization device, different time transmission protocols and different time ports are irrelevant to each other. The following problems may appear as a result:

1. When a time synchronization device has two or more time transmission protocols and/or time ports, preferably one of the transmission protocols and ports is manually selected through the time synchronization device. However, since these protocols are independently operated, even if the time information of a time transmission protocol which is selected as a port are degraded or invalid, the time transmission protocol will still be preferably used because it is a preconfigured time transmission protocol. Therefore, the flexibility and reliability of the device are decreased.

2. if a part of network A uses one type of time transmission protocol and port, and a part of network B uses another type of time transmission protocol and port, when A transmits time information to B, the status of time information may be lost and an error may happen during selecting time information in B because of the difference between two types of time transmission protocols and ports.

SUMMARY OF THE INVENTION

Embodiment of the present disclosure provides a time synchronization method for a mobile communication system so as to improve flexibility of the system as well as the quality and reliability of time information.

Embodiment of the present disclosure provides a time synchronization device for a mobile communication system so as to improve flexibility of the system as well as the quality and reliability of time information.

In order to fulfill the above aims, the technical solutions of the embodiments of the present disclosure are as follows.

A time synchronization method for a mobile communication system is provided the method comprises:

selecting respectively an optimal time source for each type of time protocol port of at least two types of time protocol ports;

selecting a system optimal time source from optimal time sources for respective types of time protocol ports.

Selecting respectively the optimal time source for each type of time protocol port may comprise: for each type of time protocol port, selecting a time source having a highest time source priority as the optimal time source for this type of time protocol port.

Selecting respectively the optimal time source for each type of time protocol port may comprise: for each type of time protocol port, selecting a time source having a best status of time information as the optimal time source for this type of time protocol port.

Selecting respectively the optimal time source for each type of time protocol port may comprise: for each type of time protocol port, selecting a time source having a highest port priority as the optimal time source for this type of time protocol port.

Selecting respectively the optimal time source for each type of time protocol port may comprise:

for each type of time protocol port, selecting a time source having a highest time source priority as the optimal time source for this type of time protocol port, if at least two time sources have the same and highest time source priority, selecting a time source having a best status of time information from the time sources having the same and highest time source priority as the optimal time source for this type of time protocol port; if at least two time sources selected from the at least two time sources having the same and highest time source priority have the same status of time information, selecting a time source having a highest port priority from the time sources having the same status of time information as the optimal time source for this type of time protocol port.

Selecting a system optimal time source from optimal time sources for respective types of time protocol ports may comprise: selecting an optimal time source having preset highest time protocol level from optimal time sources for respective types of time protocol ports as a system optimal time source.

Selecting a system optimal time source from optimal time sources for respective types of time protocol ports may comprise: selecting an optimal time source having best status of time information after united mapping from optimal time sources for respective types of time protocol ports as a system optimal time source.

Selecting a system optimal time source from optimal time sources for respective types of time protocol ports may comprise: selecting an optimal time source having preset highest time protocol priority from optimal time sources for respective types of time protocol ports as a system optimal time source.

Selecting a system optimal time source from optimal time sources for respective types of time protocol ports may comprise:

selecting an optimal time source having preset highest time protocol level from optimal time sources for respective types of time protocol ports as a system optimal time source, wherein if at least two optimal time sources have the same and highest preset time protocol level, selecting an optimal time source having the best status of time information after unified mapping from the at least two optimal time sources having the same and highest preset time protocol level as a system optimal time source.

Selecting a system optimal time source from optimal time sources for respective types of time protocol ports may comprise:

selecting an optimal time source having preset highest time protocol level from optimal time sources for respective types of time protocol ports as a system optimal time source, wherein if at least two optimal time sources have the same and highest preset time protocol level, selecting an optimal time source having the best status of time information after unified mapping from the at least two optimal time sources having the same and highest preset time protocol level as a system optimal time source, if the at least two optimal time sources having the same and highest preset time protocol level have the same status of time information after unified mapping, selecting an optimal time source having the highest time protocol priority from the at least two optimal time sources having the same status of time information as a system optimal time source.

The mobile communication system may comprise: a Code Division Multiple Access 2000 (CDMA2000) system, a Wideband Code Division Multiple Access (WCDMA) system, or a Time Division-Synchronous Code Division Multiple Access (TD-SCDMA) system.

The method may further comprise:

distributing the selected system optimal time source to each time output port; wherein if the system optimal time source and the time output port have different types of time protocols, time information and time status of the system optimal time source are mapped to time information and time status supported by this type of time output port; if the system optimal time source and the time output port have the same type of time protocol, time information of the system optimal time source is directly used.

A time synchronization device for a mobile communication system, the device comprises a time protocol port optimal time source selecting unit and a system optimal time source selecting unit, wherein, the time protocol port optimal time source selecting unit is configured to select respectively an optimal time source for each type of time protocol port of at least two types of time protocol ports;

the system optimal time source selecting unit is configured to select a system optimal time source from optimal time sources for respective types of time protocol ports.

The time protocol port optimal time source selecting unit may be configured to: for each type of time protocol port, select a time source having a highest time source priority as the optimal time source for this type of time protocol port; or for each type of time protocol port, select a time source having a best status of time information as the optimal time source for this type of time protocol port; or for each type of time protocol port, select a time source having a highest port priority as the optimal time source for this type of time protocol port.

The time protocol port optimal time source selecting unit may be configured to: for each type of time protocol port, select a time source having a highest time source priority as the optimal time source for this type of time protocol port; if at least two time sources having the same and highest time source priority, select a time source having a best status of time information from the time sources having the same and highest time source priority as the optimal time source for this type of time protocol port; if at least two time sources selected from the at least two time sources having the same and highest time source priority have the same status of time information, select a time source having a highest port priority from the time sources having the same status of time information as the optimal time source for this type of time protocol port.

The system optimal time source selecting unit may be configured to select an optimal time source having preset highest time protocol level from optimal time sources for respective types of time protocol ports as a system optimal time source; or select an optimal time source having best status of time information after united mapping from optimal time sources for respective types of time protocol ports as a system optimal time source; or select an optimal time source having preset highest time protocol priority from optimal time sources for respective types of time protocol ports as a system optimal time source.

The system optimal time source selecting unit may be configured to select an optimal time source having preset highest time protocol level from optimal time sources for respective types of time protocol ports as a system optimal time source, wherein if at least two optimal time sources have the same and highest preset time protocol level, select an optimal time source having the best status of time information after unified mapping from the at least two optimal time sources having the same and highest preset time protocol level as a system optimal time source.

The system optimal time source selecting unit may be configured to: if the at least two optimal time sources having the same and highest preset time protocol level have the same status of time information after unified mapping, select an optimal time source having the highest time protocol priority from the at least two optimal time sources having the same status of time information as a system optimal time source.

The device may further comprise a system optimal time source distribution unit, wherein, the system optimal time source distribution unit may be configured to distribute the selected system optimal time source to each time output port; wherein if the system optimal time source and the time output port have different types of time protocols, time information and time status of the system optimal time source are mapped to time information and time status supported by this type of time output port; if the system optimal time source and the time output port have the same type of time protocol, time information of the system optimal time source is directly used.

In the above technical solutions, for at least two types of time protocol ports, an optimal time source for each type of time protocol port may be respectively selected, then a system optimal time source may be selected from optimal time sources for respective types of time protocol ports. Therefore, after implementing the embodiments of the present disclosure, a system time source is comprehensively selected in respect of a plurality of types of time protocol statuses, rather than a single type of time protocol setting is configured. Therefore, when the time status of one type of time protocol is bad, another time protocol having a better status may be automatically selected. Therefore, the system flexibility and the quality and reliability of the time information can be improved.

Furthermore, each value of the status parameter of each type of time protocol may be mapped into the time status value unified by the device by presetting and storing the status mapping tables for different time protocols. When a plurality of types of protocols are used in the network, the time status can be freely converted and delivered. When the whole network partly uses one type of time protocol and partly uses another type of protocol interface, the time information can be delivered and the time source can be selected through the whole network. Therefore no time status information may be lost.

DETAILED DESCRIPTION OF THE PREFERRED EMBODIMENTS

In order to clearly set forth the aims, technical solutions and advantages of embodiments of the present disclosure, the embodiments of the present disclosure are further described in conjunction with drawings and embodiments.

Embodiments of the present disclosure provide a time synchronization method for a mobile communication system. A system time source may be comprehensively selected based on a plurality of types of time protocol statuses. Therefore, when the time status of one type of time protocol is bad, another time protocol having a better status may be automatically selected. Therefore, the system flexibility and the quality and reliability of the time information can be improved.

Figure 1:
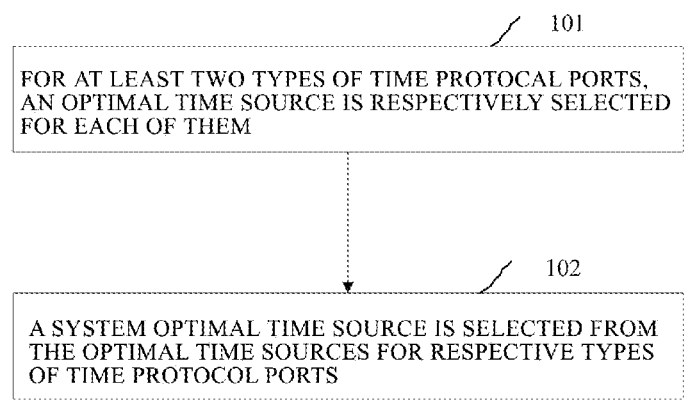
FIG. 1 is a flow chart illustrating a time synchronization method for a mobile communication system according to an embodiment of the present disclosure.

FIG. 1 is a flow chart illustrating a time synchronization method for a mobile communication system according to an embodiment of the present disclosure.

As shown in FIG. 1, the method may comprise the following steps:

Step 101: for at least two types of time protocol ports, an optimal time source may be respectively selected for each type of time protocol port.

Herein, for a plurality of (at least two) types of time protocols, an optimal time source may be respectively selected for each type of time protocol port.

For example, it is assumed that there are three different types of time protocols and ports, i.e., time protocols A, B and C. An optimal time source for time protocol A, an optimal time source for time protocol B, and an optimal time source for time protocol C are respectively selected. Herein, for an input port corresponding to each specific time protocol, specific operations may include identifying a time information message and extracting time information, and so on. When an optimal time source is selected for each type of time protocol, specific selections are implemented based on at least one of time source priority, status of the time information and port priority.

When a physical port transmits a plurality of types of time protocols, after message identification, the physical port may categorize messages of different time protocols and send them to a time protocol port corresponding to the time protocol.

When the same type of time protocols have a plurality of input ports (i.e., a plurality of time sources), an optimal time source in a plurality of ports of this type of time protocols is preselected from respective input ports as the optimal time source for this type of time protocol port.

In one embodiment, for each type of time protocol port, a time source having a highest time source priority may be selected as the optimal time source for this type of time protocol port.

In another embodiment, for each type of time protocol port, a time source having a best status of time information may be selected as the optimal time source for this type of time protocol port.

In another embodiment, for each type of time protocol port, a time source having a highest port priority may be selected as the optimal time source for this type of time protocol port.

In another embodiment, an optimal time source for a time protocol port may be determined based on the overall consideration of time source priority, status of time information and port priority.

For example, for each type of time protocol port, a time source having a highest time source priority may be selected as the optimal time source for this type of time protocol port. If at least two time sources have the same highest time source priority, a time source having a best status of time information may be selected from the at least two time sources having the same highest time source priority as the optimal time source for this type of time protocol port. If at least two time source selected from the at least two time sources having the same highest time source priority have the same status of time information, a time source having a highest port priority may be selected from the time sources having the same status of time information as the optimal time source for this type of time protocol port.

Specifically, if a time protocol carries time source information, the priorities of time sources are firstly compared. For a plurality of ports, time information may come from different devices (derived from different main clocks). Different main clocks have different priorities, a port having a higher time source priority may be selected after this comparison.

Furthermore, if ports have the same time source priority, statuses of time information of these ports are compared. The status of time information represents that the time information is in a normal status, a degraded status, an invalid status or degraded sub-statuses. Meanwhile, for some dynamically routed time protocols, status of time information may comprise information such as hops through a time chain. A port having a better status may be selected after comparing the statuses of time information.

If ports have the same parameters such as the same time source priority and the same status of time information, the priorities of these ports may be compared. Each port of the device may be preset with a priority, and any two ports do not have the same priority. If other parameters are all the same, after comparing port priorities, the time source of a port can be determined as the optimal time source for this type of time protocol port.

Although some exemplary embodiments specifically describe how a time protocol port selects an optimal time source. A person skilled in the art should realize that these embodiments are only for illustrative purpose and do not intend to limit the protection scope of the present disclosure.

For example, weights of the time source priority, the status of time information and the port priority may be set, and an optimal time source for this type of time protocol port can be determined by analysis of these weights.

After selecting an optimal time source for each type of time protocol port in Step S101, the process goes to Step 102.

Step 102: a system optimal time source may be selected from optimal time sources for respective types of time protocol ports.

Herein, for comparing a plurality time protocols and ports, time protocol level and time protocol priority may be preset and stored. For example, respective time protocols can be divided into several time levels according to the time protocol's characteristics and time precision to be reached. Time protocols whose time precisions are in the same magnitude can be divided into the same time level. The priorities of several time protocols and ports belonging to the same level can be further divided. The priority can be set and modified by a network administrator of a device so as to meet application requirement and select a preferably used time protocol.

At least one of preset time protocol level, preset time protocol priority and the status of time information after unified mapping may be used to select a system optimal time source.

In an embodiment, an optimal time source having the highest preset time protocol level may be selected from the optimal time sources for respective types of time protocol ports as a system optimal time source.

In another embodiment, an optimal time source having the best status of time information after unified mapping is selected from the optimal time sources for respective types of time protocol ports as a system optimal time source.

Specifically, since different types of time information uses different status parameters and value definitions, a status mapping table for different time protocols are preset and stored for the purpose of comparison, then each value of status parameters of each type of time protocol may be mapped into a unified time status value of a device, so as to compare the statuses of time information after unified mapping.

Taking the following as an example:

It is assumed that the time status of protocol A is represented by parameter CLASS_A. The range of CLASS_A is 0-128 with binary codes. The value is smaller, the time status is better. The time status of protocol B is represented by parameter CLASS_B. CLASS_B has five statuses, ASCII codes A, B, C, D, E respectively represent time status levels. A means the best status and E means the worst status.

Based on the meaning of each value of CLASS_A and CLASS_B, the time statuses having the similar meaning for protocol A and protocol B are divided into one kind of time status. Table 1 is used for mapping into unified time status value. For example, when the time status parameter sent by the optimal time source of protocol A is 20, a mapping is to be conducted according to the status mapping table. Since 20 is in the range of 8-29, the optimal time source status of protocol A 20 is mapped into 1. When the time status parameter sent by the optimal time source of protocol B is C, a centralized time status mapping module will map it into 2.

TABLE 1

| Time status parameter of protocol A CLASS_A codes | Time status parameter of protocol B CLASS_B codes | Unified time status value | Description of the unified time status value |
|---|---|---|---|
| 0~7 | A | 0 | Signal is normal |
| 8~29 | B | 1 | Degraded, but still suggested as the master clock |
| 30~73 | C | 2 | Further degraded |
| 74~100 | D | 3 | Degraded, not suggested as the master clock |
| 100~128 | E | 4 | Signal cannot be used |

In another embodiment, an optimal time source having preset highest time protocol priority may be selected from the optimal time sources of respective types of time protocol ports as a system optimal time source.

In another embodiment, an optimal time source having preset highest time protocol level may be selected from the optimal time sources of respective types of time protocol ports as a system optimal time source. If the time protocol levels of at least two optimal time sources are the same and highest, the optimal time source having the best status of time information after unified mapping may be selected from the at least two optimal time sources having the same and highest time protocol levels as a system optimal time source.

In another embodiment, an optimal time source having preset highest time protocol level may be selected from the optimal time sources of respective types of time protocol ports as a system optimal time source. If the time protocol levels of at least two optimal time sources are the same and highest, an optimal time source having the best status of time information after unified mapping may be selected from the at least two optimal time sources having the same and highest time protocol levels as a system optimal time source. If the at least two optimal time sources having the same and highest time protocol levels have the same status of time information after unified mapping, an optimal time source having preset highest time protocol priority may be selected from the at least two optimal time sources having the same status of time information as a system optimal time source.

More specifically, time protocol levels are firstly compared, time source information of a time protocol having a higher time level may be selected from time source information of several time protocol ports as a system time source. If the time protocols have the same level, time status information are further compared so as to select a time source having a better status. The time status information used here may be a unified time information status after mapping through a system status mapping table. The time status information can be compared. If both the time protocol level and the time status information are the same, time protocol priorities are finally compared, wherein the time protocol priority may be a time protocol that is preferably used determined by the device. After comparison, one time source may be selected as the system optimal time source.

After Step 102, the system optimal time source may be selected. The selected system optimal time source may be sent to a system time synchronization module. The system time module consists of a system internal clock and a system phase locked loop. A local system may track and adjust a local system clock based on the time source sent by a time source selecting module. The local clock may output high precision system time for respective time output ports. Time information messages of different protocols may be generated at respective time output ports. After selecting a system optimal time source, the system optimal time source may be distributed to respective time output ports. If the system optimal time source and the time output port have different types of time protocols, the time information and the time status of the system optimal time source are mapped to a time information and a time status supported by this type of time output port. If the system optimal time source and the time output port have the same type of time protocol, the time information of the system optimal time source may be used directly.

Specifically, time status information of a time source selected by a system may be provided to a time output port. If the time source selected by the system and the time output port use the same protocol, the time status of the time output port directly employs the information of the time source selected by a port of this type of protocol. If the time source selected by the system and the time output port use different protocols, the time protocol of the time output port employs the time source selected by the system to implement mapping through a time status mapping table.

If the time source selected by the system and the time output port use different protocols and the time source selected by the system does not include time chain hop information, while the protocol of the time output port has time chain hop information, the time chain hop number may be set to 0 at the time output port directly.

Based on the above analysis, a port optimal time source selection method is described as follows.

Figure 2:
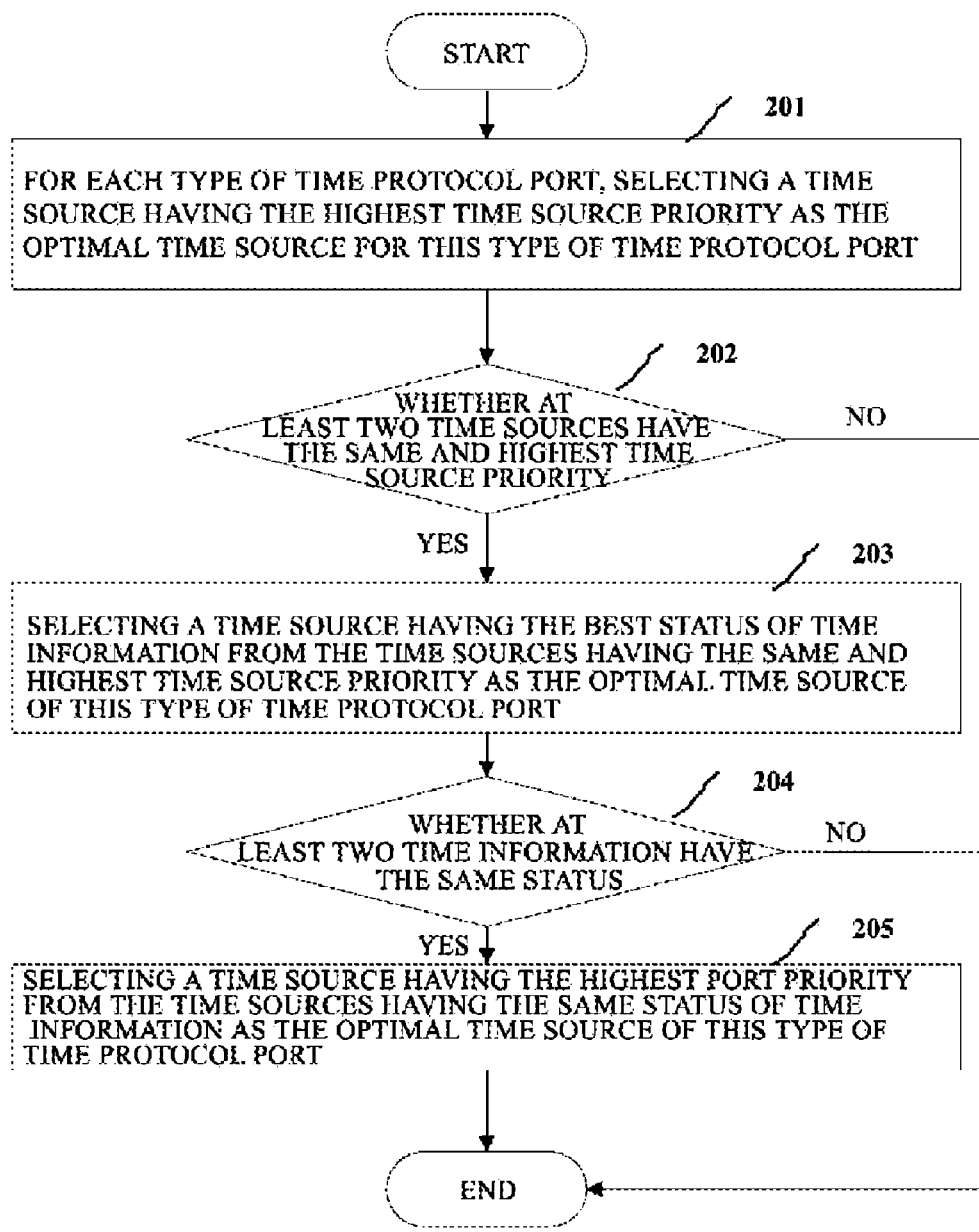
FIG. 2 is a flow chart illustrating a port optimal time source selection method according to an embodiment of the present disclosure.

FIG. 2 is a flow chart illustrating a port optimal time source selection method according to an embodiment of the present disclosure.

As shown in FIG. 2, the method may comprise:

Step 201: for each type of time protocol port, a time source having the highest time source priority may be selected as the optimal time source for this type of time protocol port.

Step 202: whether at least two time sources have the same and highest time source priority may be determined. If yes, proceeds to step 203 and the subsequent steps, otherwise, exits from the process.

Step 203: a time source having the best status of time information may be selected from the time sources having the same and highest time source priority as the optimal time source of this type of time protocol port.

Step 204: whether at least two time information selected from the time sources having the same and highest time source priority have the same status may be determined. If yes, proceeds to Step 205 and the subsequent steps, otherwise, exits from the process.

Step 205: a time source having the highest port priority may be selected from the time sources having the same status of time information as the optimal time source of this type of time protocol port.

Based on the above analysis, a system optimal time source selection method is described as follows.

Figure 3:
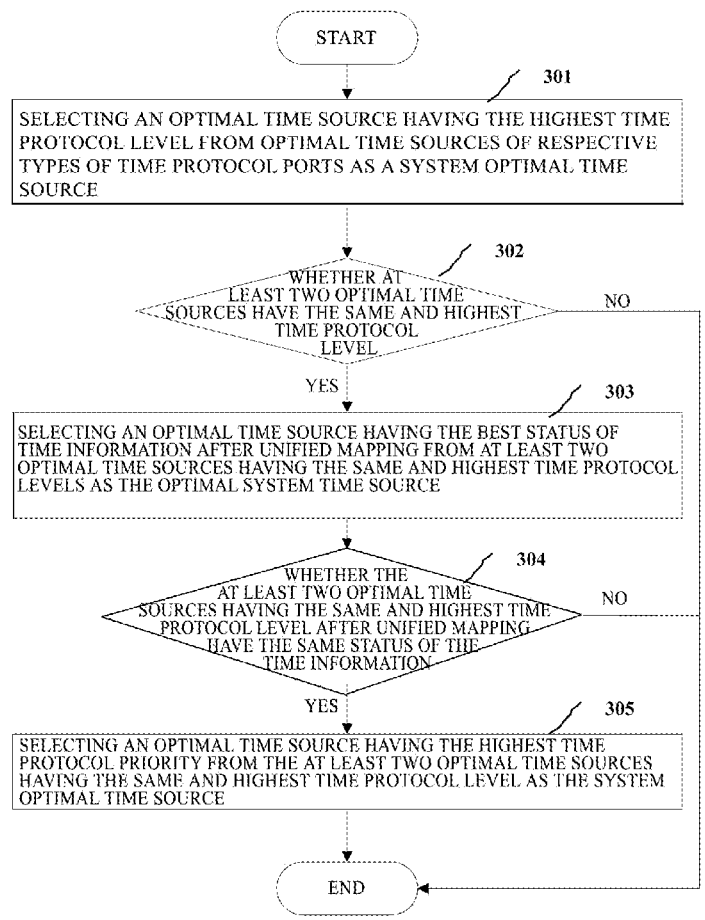
FIG. 3 is a flow chart illustrating a system optimal time source selection method according to an embodiment of the present disclosure.

FIG. 3 is a flow chart illustrating a system optimal time source selection method according to an embodiment of the present disclosure.

As shown in FIG. 3, the method may comprise:

Step 301: an optimal time source having a preset highest time protocol level may be selected from optimal time sources of respective types of time protocol ports as the system optimal time source.

Step 302: whether at least two optimal time sources have the same and highest time protocol level may be determined. If yes, proceeds to step 303 and the subsequent steps, otherwise, exits from the process.

Step 303: an optimal time source having the best status of time information after unified mapping may be selected from at least two optimal time sources having the same and highest time protocol levels as the optimal system time source.

Step 304: whether the at least two optimal time sources having the same and highest time protocol level after unified mapping have the same status of the time information may be determined. If yes, proceeds to Step 305 and the subsequent steps, otherwise, exits from the process.

Step 305: an optimal time source having the highest time protocol priority may be selected from the at least two optimal time sources having the same and highest time protocol level as the system optimal time source.

Based on the above analysis, an embodiment of the present disclosure provides a time synchronization device for a mobile communication system.

Figure 4:
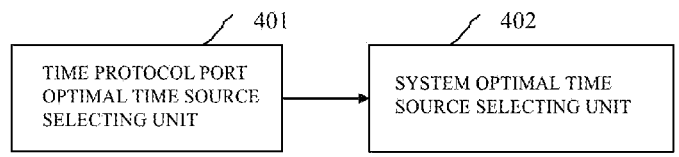
FIG. 4 is a schematic diagram illustrating a configuration of a time synchronization device for a mobile communication system according to an embodiment of the present disclosure.

FIG. 4 is a diagram illustrating a configuration of a time synchronization device for a mobile communication system according to an embodiment of the present disclosure.

As shown in FIG. 4, the device may include a time protocol port optimal time source selecting unit 401 and a system optimal time source selecting unit 402.

For at least two types of time protocol ports, the time protocol port optimal time source selecting unit 401 may be configured to select an optimal time source for each type of time protocol port.

The system optimal time source selecting unit 402 may be configured to select a system optimal time source from the optimal time sources of respective types of time protocol ports.

In one embodiment, for each type of time protocol port, the time protocol port optimal time source selecting unit 401 may be used to select a time source having the highest time source priority as the optimal time source for this type of time protocol ports.

In another embodiment, for each type of time protocol port, the time protocol port optimal time source selecting unit 401 may be used to select a time source having the best status of time information as the optimal time source for this type of time protocol port.

In another embodiment, for each type of time protocol port, the time protocol port optimal time source selecting unit 401 may be used to select a time source having the highest port priority as the optimal time source for this type of time protocol port.

In another embodiment, for each type of time protocol port, the time protocol port optimal time source selecting unit 401 may be used to select a time source having the highest time source priority as the optimal time source for this type of time protocol port. If at least two time sources have the same and highest time source priority, a time source having the best status of time information may be selected from the at least two time sources having the same and highest time source priority as the optimal time source for this type of time protocol port. If at least two time source selected from the at least two time sources having the same and highest time source priority have the same status of time information, a time source having the highest port priority may be selected from the time sources having the same status of time information as the optimal time source for this type of time protocol port.

In another embodiment, the system optimal time source selecting unit 402 may be used to select an optimal time source having a preset highest time protocol level from the optimal time sources for respective types of time protocol ports as the system optimal time source.

In another embodiment, the system optimal time source selecting unit 402 may be used to select an optimal time source having the best status of time information after unified mapping from the optimal time sources for respective types of time protocol ports as the system optimal time source.

In another embodiment, the system optimal time source selecting unit 402 may be used to select an optimal time source having a preset highest time protocol priority from the optimal time sources of respective types of time protocol ports as the system optimal time source.

In another embodiment, the system optimal time source selecting unit 402 may be used to select the optimal time source having a preset highest time protocol level from the optimal time sources of respective types of time protocol ports as the system optimal time source. If the time protocol levels of at least two optimal time sources are the same and highest, the optimal time source having the best status of time information after unified mapping may be selected from the at least two optimal time sources having the same and highest time protocol levels as the system optimal time source.

In another embodiment, the system optimal time source selecting unit 402 may be used to select the optimal time source having a preset highest time protocol level from the optimal time sources of respective types of time protocol ports as the system optimal time source. If the time protocol levels of at least two optimal time sources are the same and highest, the optimal time source having the best status of time information after unified mapping may be selected from the at least two optimal time sources having the same and highest time protocol levels as the system optimal time source. If the at least two optimal time sources having the same and highest time protocol levels have the same status of time information after unified mapping, the optimal time source having a preset highest time protocol priority may be selected from the at least two optimal time sources having the same status of time information as the system optimal time source.

Preferably, the device may further include a system optimal time source distribution unit (not shown in Figs.). The system optimal time source distribution unit distributes the selected system optimal time source to each time output port. If the system optimal time source and the time output port have different types of time protocols, the time information of the system optimal time source and the time status are mapped into time information and a time status supported by this type of time output port. If the system optimal time source and the time output port have the same type of time protocol, the time information of the system optimal time source may be used directly.

A person skilled in the art may realize that when applied to respective mobile communication systems, the embodiments of the present disclosure can be replaced, combined and divided so that they have a plurality application forms. The embodiments of the present disclosure do not limit such changes. For example, a centralized time status mapping module may be configured to implement unified mapping for time statuses of respective types of time protocols so as to compare these time statuses.

Figure 5:
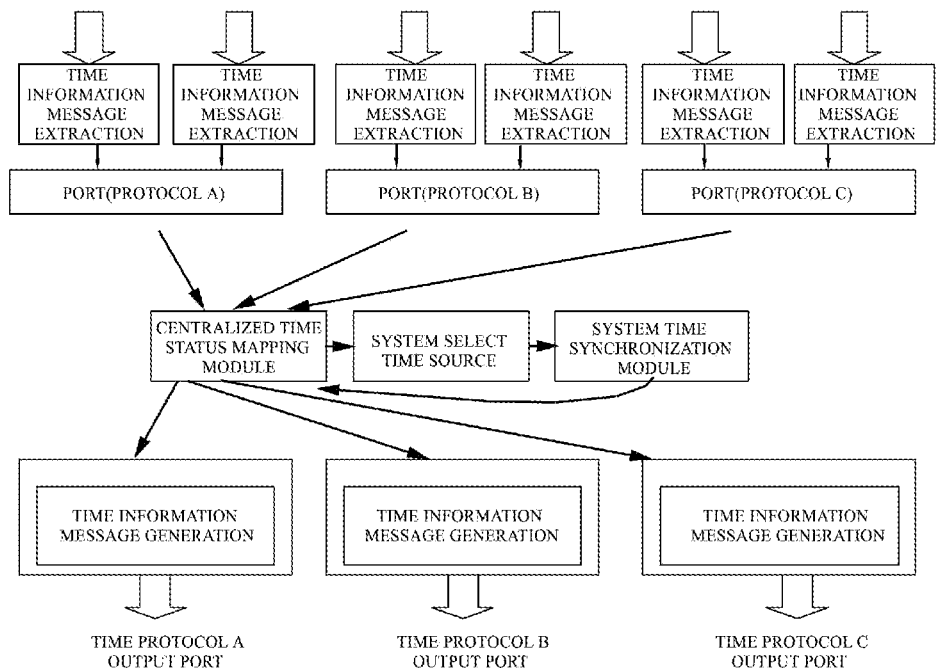
FIG. 5 is a diagram illustrating a detail configuration of a time synchronization device for a mobile communication system according to an embodiment of the present disclosure.

FIG. 5 is a diagram illustrating a detail configuration of a time synchronization device for a mobile communication system according to an embodiment of the present disclosure.

As shown in FIG. 5, logic port A, logic port B and logic port C are respectively used for protocol A, protocol B and protocol C. At these logic ports, time information messages are identified and time information are extracted. When several types of time protocols are transmitted at a certain physical port, after message identification, the physical port categorizes messages of different protocols and sends them to a logic port of corresponding protocol type.

The centralized time status mapping module in FIG. 5 may be configured to implement unified mapping for time statuses of respective types of time protocols so as to compare these time statuses. Specifically, since different types of time information uses different status parameters and value definitions, a status mapping table for different time protocols are preset and stored in the centralized time status mapping module for the purpose of comparison, then each value of status parameters of each type of time protocol may be mapped into unified time status value of a device, so that the system can select an optimal time source and the system time synchronization module can be used for time synchronization.

After selecting the system optimal time source, the selected system optimal time source may be sent to the system time synchronization module. The system time module may consist of a system internal clock and a system phase locked loop. A local system may track and adjust a local system clock based on the time source sent by the time source selecting module. The local clock may output high precision system time for respective time output ports. The time information messages of different protocols may be generated at respective time output ports. Meanwhile, the time status information of the optimal time source selected by a system may be provided to a time output port. If the optimal time source selected by the system and the time output port use the same protocol, the time status of the time output port directly use the port of the same type protocol stored in the centralized time status mapping module to select the information of time source. If the optimal time source selected by the system and the time output port use different protocols, the time protocol of the time output port utilizes the optimal time source selected by the system to implement mapping through a time status mapping table.

If the optimal time source selected by the system and the time output port use different protocols and the time source selected by the system does not include time chain hop information, while the protocol of the time output port has time chain hop information, the time chain hop number may be set to 0 at the time output port.

The time synchronization method and device described in the embodiments of the present disclosure may be applied for a plurality of mobile communication systems, which include but are not limited to: a CDMA2000 system, a WCDMA system or a TD-SCDMA system, and so on.

In summary, in the embodiments of the present disclosure, for at least two types time protocol ports, an optimal time source may be selected for each type of time protocol port. Then a system optimal time source may be selected from the optimal time sources of respective types of time protocol ports.

Herein, when the same type of time protocol has a plurality of input ports, an optimal time source among the plurality of ports of this type of time protocol may be selected from respective input ports. The optimal time source of a plurality of protocols may be selected in the centralized process module which is in the center of the system, so that the system optimal time source may be further selected. By presetting and storing the status mapping table of different time protocols, each value of the status parameter of each type of time protocol may be mapped into the time status value unified in the device. By presetting and storing time protocol level and time protocol priority in the device, respective time protocols can be divided into several time levels according to the time protocol's characteristics and the time precision to be reached. Time protocols whose time precisions are in the same magnitude can be divided into the same time level. Several time protocols and ports having the same level can be further divided based on priority.

Therefore, according to the embodiments of the present invention, a system time source may be comprehensively selected in respect of a plurality of types of time protocol statuses, rather than a single type of time protocol setting may be configured. Therefore, when the time status of one type of time protocol is bad, another time protocol with a better status may be automatically selected. The system flexibility and the quality and reliability of the time information can be improved.

Furthermore, each value of the status parameters of each type of time protocol may be mapped into the time status value unified by the device by presetting and storing the status mapping tables of different time protocols. When a plurality of types of protocols are used in a network, the time status can be freely converted and delivered. When the whole network partly uses one type of time protocol and partly uses another type of protocol interface, the time information can be delivered and the time source can be selected through the whole network. No time status information may be lost.

The above mentioned are only the embodiments of the present disclosure, which is not intended to limit the protection scope of the present disclosure. Thus any change, alternative, and modification within the spirit and principle of the embodiments of the present disclosure should be within the scope of protected by the present disclosure.

What is claimed is:

1. A time synchronization method for a mobile communication system, the method comprising:
    selecting respectively a candidate optimal time source for one or more ports corresponding to at least two types of time protocols from one or more time sources for the one or more ports, wherein with respect to the one or more ports corresponding to the at least two types of time protocols, the at least two types of time protocols are used for time synchronization respectively, and wherein each type of time protocol corresponds to one candidate optimal time source which has not yet used for system time synchronization; and
    selecting one system optimal time source which is used for system time synchronization from the selected plurality of candidate optimal time sources for ports corresponding to respective types of time protocols.

2. The time synchronization method for a mobile communication system according to claim 1, wherein the selecting respectively the optimal time source for one or more ports corresponding to at least two types of time protocol port of protocols comprises:
    for each type of time protocol port, selecting a time source having a highest time source priority as the optimal time source for this type of time protocol port; or
    for each type of time protocol port, selecting a time source having a best status of time information as the optimal time source for this type of time protocol port; or
    for each type of time protocol port, selecting a time source having a highest port priority as the optimal time source for this type of time protocol port.

3. The time synchronization method for a mobile communication system according to claim 1, wherein the selecting respectively the optimal time source for one or more ports corresponding to at least two types of time protocol port of protocols comprises:
    for each type of time protocol port, selecting a time source having a highest time source priority as the optimal time source for this type of time protocol port; when at least two time sources have the same and highest time source priority, selecting a time source having a best status of time information from the time sources having the same and highest time source priority as the optimal time source for this type of time protocol port; when at least two time sources selected from the at least two time sources having the same and highest time source priority have the same status of time information, selecting a time source having a highest port priority from the time sources having the same status of time information as the optimal time source for this type of time protocol port.

4. The time synchronization method for a mobile communication system according to claim 1, wherein the selecting the system optimal time source from optimal time sources for ports corresponding to respective types of time protocols comprises:
    selecting an optimal time source having preset highest time protocol level from optimal time sources for respective types of time protocol ports as a system optimal time source; or
    selecting an optimal time source having best status of time information after united mapping from optimal time sources for respective types of time protocol ports as a system optimal time source; or
    selecting an optimal time source having preset highest time protocol priority from optimal time sources for respective types of time protocol ports as a system optimal time source.

5. The time synchronization method for a mobile communication system according to claim 1, wherein the selecting the system optimal time source from optimal time sources for ports corresponding to respective types of time protocols comprises:
    selecting an optimal time source having preset highest time protocol level from optimal time sources for respective types of time protocol ports as a system optimal time source; when at least two optimal time sources have the same and highest preset time protocol level, selecting an optimal time source having the best status of time information after unified mapping from the at least two optimal time sources having the same and highest preset time protocol level as a system optimal time source.

6. The time synchronization method for a mobile communication system according to claim 5, wherein the method further comprises:
    when the at least two optimal time sources having the same and highest preset time protocol level have the same status of time information after unified mapping, selecting an optimal time source having the highest time protocol priority from the at least two optimal time sources having the same status of time information as a system optimal time source.

7. The time synchronization method for a mobile communication system according to claim 1, wherein the mobile communication system comprises:
    a Code Division Multiple Access 2000 (CDMA2000) system, a Wideband Code Division Multiple Access (WCDMA) system, or a Time Division-Synchronous Code Division Multiple Access (TD-SCDMA) system.

8. The time synchronization method for a mobile communication system according to claim 1, wherein the method further comprises:
    distributing the selected system optimal time source to each time output port;
    wherein when the system optimal time source and the time output port have different types of time protocols, time information and time status of the system optimal time source are mapped to time information and time status supported by this type of time output port; or
    when the system optimal time source and the time output port have the same type of time protocol, time information of the system optimal time source is directly used.

9. The time synchronization method for a mobile communication system according to claim 2, wherein the method further comprises:
- distributing the selected system optimal time source to each time output port;
- wherein when the system optimal time source and the time output port have different types of time protocols, time information and time status of the system optimal time source are mapped to time information and time status supported by this type of time output port; or
- when the system optimal time source and the time output port have the same type of time protocol, time information of the system optimal time source is directly used.

10. A time synchronization device for a mobile communication system, wherein the device comprises a time protocol port optimal time source selecting unit and a system optimal time source selecting unit, wherein
- the time protocol port optimal time source selecting unit is configured to select respectively a candidate optimal time source for one or more ports corresponding to at least two types of time protocols from one or more time sources for the one or more ports, wherein with respect to the one or more ports corresponding to the at least two types of time protocols, the at least two types of time protocols are used for time synchronization respectively, and wherein each type of time protocol corresponds to one candidate optimal time source which has not yet used for system time synchronization; and
- the system optimal time source selecting unit is configured to select one system optimal time source which is used for system time synchronization from the selected plurality of candidate optimal time sources for ports corresponding to respective types of time protocols.

11. The time synchronization device for a mobile communication system according to claim 10, wherein
- the time protocol port optimal time source selecting unit is configured to: for each type of time protocol port, select a time source having a highest time source priority as the optimal time source for this type of time protocol port; or for each type of time protocol port, select a time source having a best status of time information as the optimal time source for this type of time protocol port; or for each type of time protocol port, select a time source having a highest port priority as the optimal time source for this type of time protocol port.

12. The time synchronization device for a mobile communication system according to claim 11, wherein the device further comprises a system optimal time source distribution unit, wherein
- the system optimal time source distribution unit is configured to distribute the selected system optimal time source to each time output port;
- when the system optimal time source and the time output port have different types of time protocols, time information and time status of the system optimal time source are mapped to time information and time status supported by this type of time output port; or
- when the system optimal time source and the time output port have the same type of time protocol, time information of the system optimal time source is directly used.

13. The time synchronization device for a mobile communication system according to claim 10, wherein
- the time protocol port optimal time source selecting unit is configured to: for each type of time protocol port, select a time source having a highest time source priority as the optimal time source for this type of time protocol port; when at least two time sources have the same and highest time source priority, select a time source having a best status of time information from the time sources having the same and highest time source priority as the optimal time source for this type of time protocol port; when at least two time sources selected from the at least two time sources having the same and highest time source priority have the same status of time information, select a time source having a highest port priority from the time sources having the same status of time information as the optimal time source for this type of time protocol port.

14. The time synchronization device for a mobile communication system according to claim 13, wherein the device further comprises a system optimal time source distribution unit, wherein
- the system optimal time source distribution unit is configured to distribute the selected system optimal time source to each time output port;
- when the system optimal time source and the time output port have different types of time protocols, time information and time status of the system optimal time source are mapped to time information and time status supported by this type of time output port; or
- when the system optimal time source and the time output port have the same type of time protocol, time information of the system optimal time source is directly used.

15. The time synchronization device for a mobile communication system according to claim 10, wherein the system optimal time source selecting unit is configured to: select an optimal time source having preset highest time protocol level from optimal time sources for respective types of time protocol ports as a system optimal time source; or select an optimal time source having best status of time information after united mapping from optimal time sources for respective types of time protocol ports as a system optimal time source; or select an optimal time source having preset highest time protocol priority from optimal time sources for respective types of time protocol ports as a system optimal time source.

16. The time synchronization device for a mobile communication system according to claim 15, wherein the device further comprises a system optimal time source distribution unit, wherein
- the system optimal time source distribution unit is configured to distribute the selected system optimal time source to each time output port;
- when the system optimal time source and the time output port have different types of time protocols, time information and time status of the system optimal time source are mapped to time information and time status supported by this type of time output port; or
- when the system optimal time source and the time output port have the same type of time protocol, time information of the system optimal time source is directly used.

17. The time synchronization device for a mobile communication system according to claim 10, wherein the system optimal time source selecting unit is configured to select an optimal time source having preset highest time protocol level from optimal time sources for respective types of time protocol ports as a system optimal time source, wherein when at least two optimal time sources have the same and highest preset time protocol level, the system optimal time source selecting unit is configured to select an optimal time source having the best status of time information after unified mapping from the at least two optimal time sources having the same and highest preset time protocol level as a system optimal time source.

18. The time synchronization device for a mobile communication system according to claim 17, wherein the system optimal time source selecting unit is configured to:
when the at least two optimal time sources having the same and highest preset time protocol level have the same status of time information after unified mapping, select an optimal time source having the highest time protocol priority from the at least two optimal time sources having the same status of time information as a system optimal time source.

19. The time synchronization device for a mobile communication system according to claim 10, wherein the device further comprises a system optimal time source distribution unit, wherein
the system optimal time source distribution unit is configured to distribute the selected system optimal time source to each time output port;
when the system optimal time source and the time output port have different types of time protocols, time information and time status of the system optimal time source are mapped to time information and time status supported by this type of time output port; or
when the system optimal time source and the time output port have the same type of time protocol, time information of the system optimal time source is directly used.

20. A program product stored in a non-transitory machine readable storage medium, comprising program code that, when executed by a processor, causes the processor to perform actions comprising:
selecting respectively a candidate optimal time source for one or more ports corresponding to at least two types of time protocols from one or more time sources for the one or more ports, wherein with respect to the one or more ports corresponding to the at least two types of time protocols, the at least two types of time protocols are used for time synchronization respectively, and wherein each type of time protocol corresponds to one candidate optimal time source which has not yet used for system time synchronization; and
selecting one system optimal time source which is used for system time synchronization from the selected plurality of candidate optimal time sources for ports corresponding to respective types of time protocols.

* * * * *